(12) United States Patent
Kulkarni

(10) Patent No.: US 12,311,839 B2
(45) Date of Patent: *May 27, 2025

(54) LIGHTING STATE DETECTION FOR A VEHICLE TRAILER

(71) Applicant: HORIZON GLOBAL AMERICAS INC., Plymouth, MI (US)

(72) Inventor: Chandrakumar Kulkarni, Battle Creek, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/269,306

(22) PCT Filed: Dec. 13, 2021

(86) PCT No.: PCT/US2021/063050
§ 371 (c)(1),
(2) Date: Jun. 23, 2023

(87) PCT Pub. No.: WO2022/140095
PCT Pub. Date: Jun. 30, 2022

(65) Prior Publication Data
US 2024/0067088 A1    Feb. 29, 2024

Related U.S. Application Data

(63) Continuation of application No. 17/376,595, filed on Jul. 15, 2021, now Pat. No. 11,318,883.
(Continued)

(51) Int. Cl.
*B60Q 11/00*    (2006.01)
*B60Q 1/00*    (2006.01)
(Continued)

(52) U.S. Cl.
CPC .......... *B60Q 11/007* (2013.01); *B60Q 1/0023* (2013.01); *B60Q 1/305* (2013.01); *B60Q 1/34* (2013.01)

(58) Field of Classification Search
CPC .... B60Q 11/007; B60Q 1/305; B60Q 1/0023; B60Q 1/34
(Continued)

(56) References Cited

U.S. PATENT DOCUMENTS

| 6,218,952 B1 * | 4/2001 | Borland ................ B60Q 1/305 |
| | | 340/641 |
| 6,275,050 B1 | 8/2001 | Born et al. |

(Continued)

FOREIGN PATENT DOCUMENTS

| DE | 10201038157 | 4/2012 |
| DE | 102016221695 | 5/2018 |

OTHER PUBLICATIONS

Patent Cooperation Treaty (PCT), International Search Report and Written Opinion for Application PCT/US2021/063050 filed Dec. 13, 2021, mailed Mar. 31, 2022, International Searching Authority, EP.

*Primary Examiner* — Eric Blount
(74) *Attorney, Agent, or Firm* — DAY PITNEY LLP; George N. Chaclas

(57) ABSTRACT

A towing vehicle includes a towing control unit with circuitry to detect whether a light is connected to the electrical harness electrically coupling the vehicle to the trailer. The towing control unit may include lamp connectivity circuits for, for example, the left turn signal and the right turn signal. To determine whether the turn light is connected, the corresponding connectivity circuit periodically generates a test signal. Based on characteristics of a response signal to the test signal. The connectivity circuit determines whether the corresponding turn signal light of the trailer is connected
(Continued)

based on a response to the test signal. The connectivity circuit may distinguished whether an incandescent-based turn signal light, a light emitting diode (LED)-based turn signal light, and an open circuit is sensed based on the characteristics of the response signal.

26 Claims, 14 Drawing Sheets

Related U.S. Application Data

(60) Provisional application No. 63/129,924, filed on Dec. 23, 2020.

(51) Int. Cl.
*B60Q 1/30* (2006.01)
*B60Q 1/34* (2006.01)

(58) Field of Classification Search
USPC .................................. 324/504, 500; 340/431
See application file for complete search history.

(56) References Cited

U.S. PATENT DOCUMENTS

| | | | |
|---|---|---|---|
| 6,788,195 B1 * | 9/2004 | Stegman | B60Q 11/005 340/642 |
| 7,746,219 B1 * | 6/2010 | Paul | B60Q 1/305 340/431 |
| 2008/0238639 A1 * | 10/2008 | Hopkins | G01R 31/006 340/431 |
| 2013/0093440 A1 | 4/2013 | Aumann | |

* cited by examiner

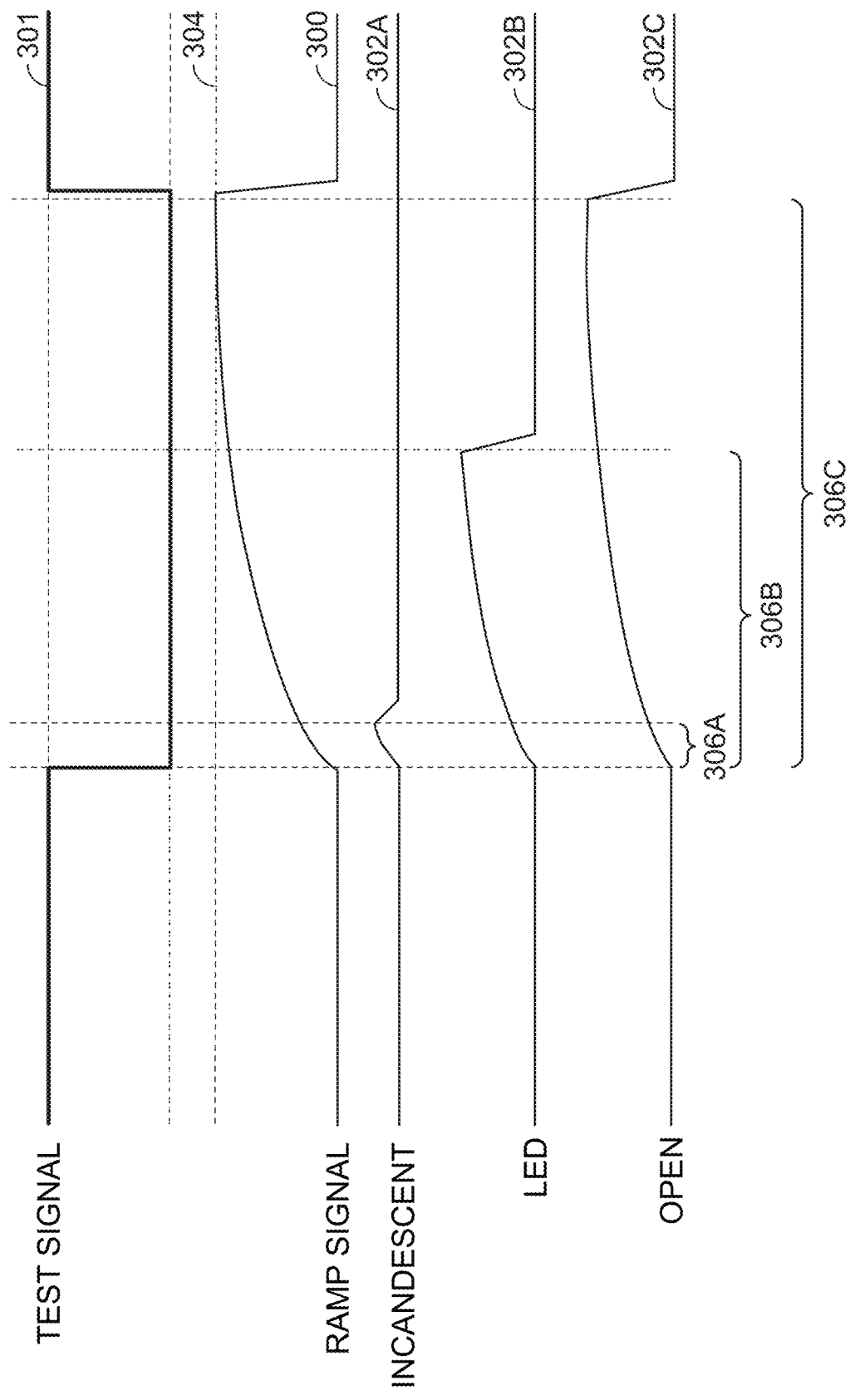

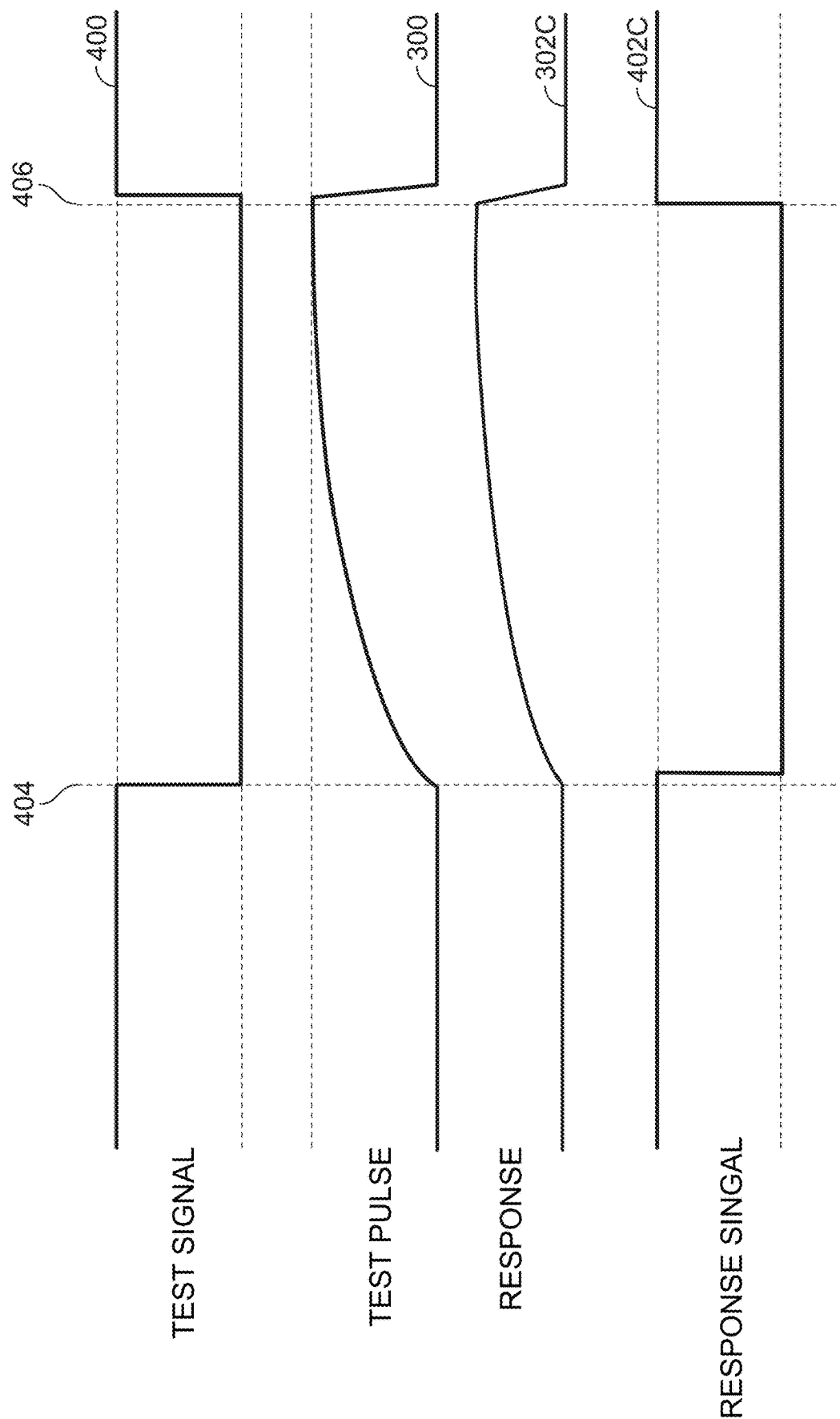

LIGHTING STATE DETECTION FOR A VEHICLE TRAILER

CROSS-REFERENCE TO RELATED APPLICATION

This application is a 35 U.S.C. 371 national stage filing of Patent Cooperation Treaty Application No. PCT/US2021/063050 filed on Dec. 13, 2021 entitled "LIGHTING STATE DETECTION FOR A VEHICLE TRAILER," which claims priority to U.S. Utility application Ser. No. 17/376,595 filed on Jul. 15, 2021, now U.S. Pat. No. 11,318,883, entitled "LIGHTING STATE DETECTION FOR A VEHICLE TRAILER," and U.S. Provisional Patent Application No. 63/129,924, entitled "LIGHTING STATE DETECTION FOR A VEHICLE TRAILER," filed Dec. 23, 2020, each of which are incorporated by reference in their entireties.

TECHNICAL FIELD

The present invention is generally related to vehicles with a towing capacity and, more specifically, a towing/lighting controller for a vehicle, such as a towed vehicle.

BACKGROUND

Modern trailers are both mechanically coupled (e.g., via a hitch, etc.) and electrically coupled (e.g., via a wire harness, etc.) to a towing vehicle. The trailer often includes lights, such as tail lights, turn signals, reverse lights, running lights, stoplights, fog lights, park lights, auxiliary lights, etc., that correspond to lights on the towing vehicle. The electrical connection is configured so the trailer lights mimic the vehicle lights in operation. In particular, to promote safety, the turning lights of the trailer must signal the turning intentions of the driver in the same manner the vehicle turning lights do. Similarly, the brake lights of the trailer must signal the braking of the towing vehicle. Because the trailer lights are not visible from the cab of the vehicle, checking whether the turning and/or braking lights are properly connected to the vehicle requires getting out of the cab or having a second person who can check the lights as they manipulated by the first person. Also, while driving, it is important to know the status of any of the lights on a trailer/towed vehicle, i.e., if it is operational or not operational, within a short time after the status changes.

SUMMARY

This disclosure relates to detection of a connection to lights of a trailer, such as turn signal lights. As described below, a towing vehicle may include a towing control unit that includes circuitry to detect whether a light is connected to the electrical harness electrically coupling the vehicle to the trailer. In some examples, the towing control unit may include a lamp connectivity circuit for the left turn signal and a connectivity circuit for a right turn signal as well as the brake signal and other lights like running, fog, reverse, auxiliary, park etc. To determine whether the turn light and/or brake lights (or any of the other lights) is connected, the corresponding connectivity circuit periodically (e.g., every 20 millisecond (ms), every 100 ms, every 250 ms, etc.) generates a test signal. Based on characteristics of a response signal to the test signal, the connectivity circuit (or, in some examples, processing circuitry coupled to the connectivity circuitry) determines whether the corresponding turn signal light and/or braking light of the trailer is connected. In some examples, the connectivity circuit may distinguish a state of the turn signal light between an incandescent-based turn signal light, a light emitting diode (LED)-based turn signal light, and an open circuit (i.e. no connected turn signal and/or brake light) based on the characteristics of the response signal. In some such examples, the connectivity circuit may determine the state based on a timing between the start of the test signal and rising edge of the response signal.

Moreover, the lights of the towed vehicle being electrically and operatively coupled with the lights of the towing vehicle can be utilized to confirm that the towed vehicle is still operatively coupled with the towing vehicle.

An example system to determine a connection state of lamps of a trailer includes connectivity circuitry and processing circuitry. The connectivity circuitry is electrically coupled to a connector to provide a test signal to the lamps of the trailer. The connectivity circuitry also conditions a response signal indicative of the connection state and the load profile. The processing circuitry is electronically coupled to the connectivity circuitry. The processing circuitry determines the connection state and the load profile of the lamps of the trailer based on the response signal when the lamps of the trailer are off. In some examples systems, the processing circuitry distinguishes between at least three different load profiles. In some example systems, the processing circuitry distinguishes between (a) a first load profile indicative that no lamps of the trailer are connected to the connector, (b) a second load profile indicative that the lamps of the trailer are incandescent-based lamps, (c) and a third load profile indicative that the lamps of the trailer are light emitting diode-based lamps. In some systems, the processing circuitry distinguishes between the first load profile, the second load profile, and the third load profile based on timing characteristic of the response signal. In some example systems, the processing circuitry determines that load profile of the lamps of the trailer is the first load profile based on the timing characteristic being below a first threshold. In some example systems, the processing circuitry determines that load profile of the lamps of the trailer is the second load profile based on the timing characteristic being between a first threshold and a second threshold greater than the first threshold. In some example systems, the processing circuitry determines that load profile of the lamps of the trailer is the third load profile based on the timing characteristic being above a second threshold that is greater than the first threshold. In some example systems, the lamps are turn signal lamps of the trailer. In some example systems, the lamps are at least one of running lamps, fog lamps, reverse lamps, auxiliary lamps, or park lamps.

In some examples, the system includes lamp control circuitry that is separate from the connectivity circuitry. The lamp control circuitry controls the on/off state of the lamps of the trailer. Additionally, the lamp control circuitry is communicably coupled to an electronic control unit of a towing vehicle. In some example systems, the processing circuitry defines a state machine to asynchronously control the connectivity circuitry to provide the test signal and determine the connection state and load profile of the lamps of the trailer. In some example systems, the connectivity circuitry includes a right lamp connectivity circuit and a left lamp connectivity circuit. The processing circuitry defines a test cycle to periodically test the connection state and the load profile of the lamps of the trailer by causing the right lamp connectivity circuit to produce a first test signal at a first time that generates a first response signal and causing the left lamp connectivity circuit to produce a second test signal at a second time that generates a second response signal. In some example systems, the processing circuitry defines a duration of the test signal(s) such that the lamps, when present, do not visibly illuminate in response to the test signal. In some example systems, the processing circuitry detects when the lamps are powered on. The processing circuitry suspends generating the test signal while the lamps are powered on in response to detecting that the lamps are powered on.

In some example systems, the test signal is a first test signal. In such example systems, the connectivity circuitry provides a second tests signal to the same one of the lamps as the first test signal. In some such example systems, the processing circuitry measures a first voltage at first current threshold of a signal generated in response to the first test signal and a second voltage at a second current threshold of a signal generated in response to the first test signal. The first current threshold is set to be different than the second current threshold. In some such example systems, the processing circuitry detects a presence of corrosion between the connector and the lamps based on a different between the first voltage and the second voltage.

An example system to determine a connection state and a load profile of lamps of a vehicle includes connectivity circuitry and processing circuitry. The connectivity circuitry is directly electrically coupled to the lamps to provide a test signal. The connectivity circuitry also conditions a response signal indicative of the connection state and the load profile. The processing circuitry is electronically coupled to the connectivity circuitry. The processing circuitry determines the connection state and the load profile of the lamps of the trailer based on the response signal when the lamps of the trailer are off.

An example method of determining a connection state of lamps of a trailer includes monitoring an on/off state of the lamps of the trailer. The example method also includes, when the lamps of the trailer are off, (a) generating a first ramp signal for a first one of the lamps. (b) monitoring a first response signal generated in response to the first ramp signal, (c) generating a second ramp signal for a second one of the lamps, (d) monitoring a second response signal generated in response to the second ramp signal, and (e) categorizing the connection state and a load profile of the lamps of the trailer based on the first and second response signals. In some example methods, categorizing the connection state of the lamps of the trailer based on the first and second response signals includes distinguishing between at least three load profiles. In some example methods, categorizing the load profile of the lamps of the trailer based on the first and second response signals includes distinguishing between (a) a first load profile indicative that no lamps of the trailer are connected to the connector; (b) a second load profile indicative that the lamps of the trailer are incandescent-based lamps; and (c) a third load profile indicative that the lamps of the trailer are light emitting diode-based lamps.

In some example methods, distinguishing between the first load profile, the second load profile, and the third load profile includes distinguishing between the first load profile, the second load profile, and the third load profile based on a timing characteristic of the response signals. In some example methods, distinguishing between the first load profile, the second load profile, and the third load profile includes determining that the load profile of each of the lamps of the trailer is the first load profile based on the timing characteristics being below a first threshold. In some example methods, distinguishing between the first load profile, the second load profile, and the third load profile includes determining that the load profile of each of the lamps of the trailer is the second load profile based on the timing characteristic being between a first threshold and a second threshold greater than the first threshold. In some example methods, distinguishing between the first load profile, the second load profile, and the third load profile includes determining that the load profile of each of the lamps of the trailer is the third load profile based on the timing characteristic being above a second threshold that is greater than the first threshold.

An example method of determining a connection state of a lamp of a trailer includes monitoring an on/off state of the lamp of the trailer. The example method also includes, when the lamp of the trailer is off, (a) generating a ramp signal for the lamp, (b) monitoring a response signal generated in response to the ramp signal, and (c) categorizing the connection state and a load profile of the lamps of the trailer based on the response signal.

An example trailer light controller includes a left lamp connectivity circuit, a right lamp connectivity circuit, a left lamp control circuit, a right lamp control circuit, and processing circuitry. The left lamp connectivity circuit is electrically coupled to a connector to connect to a left lamp of a trailer. The left lamp connectivity circuit produces a first test signal and conditions a first response signal. The first response signal has a first timing characteristic based on a connection status and a load profile of the left lamp. The right lamp connectivity circuit is electrically coupled to the connector to connect to a right lamp of a trailer. The right lamp connectivity circuit to produces a second test signal and conditions a second response signal. The second response signal has a second timing characteristic based on a connection status and a load profile of the right lamp. The left lamp control circuit coupled to the connector to connect to the left lamp to control the on/off state of the left lamp. The right lamp control circuit coupled to the connector to connect to right lamp to control the on/off state of the right lamp. The processing circuitry (a) categorizes the connection state and the load profile of the left lamp based on the first timing characteristic of the first response signal, and (b) categorizes the connection state and the load profile of the right lamp based on the second timing characteristic of the second response signal. In some example trailer light controllers, for each of the left and right lamps, the processing circuitry distinguishes between a first load profile indicative that the corresponding lamp is not connected to the connector, and a second load profile indicative that the corresponding lamp is one of an incandescent-based lamp or a light emitting diode-based lamp.

BRIEF DESCRIPTION OF THE DRAWINGS

Operation of the present disclosure may be better understood by reference to the following detailed description taken in connection with the following illustrations, wherein:

FIG. 3 illustrates a conceptual diagram of a test signal and example response signals to determine the connection state of lights of a trailer in accordance with the teachings of this disclosure.

FIGS. 4A, 4B, and 4C illustrate example measurements of an example test signal and example response signals to determine a connection state of lights of a trailer in accordance with the teachings of this disclosure.

DETAILED DESCRIPTION

Reference will now be made in detail to exemplary embodiments of the present disclosure, examples of which are illustrated in the accompanying drawings. It is to be understood that other embodiments may be utilized and structural and functional changes may be made without departing from the respective scope of the present disclosure. Moreover, features of the various embodiments may be combined or altered without departing from the scope of the present disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

The present system can detect low current lights (such as LED lights) as well as incandescent lights, can do this over a very short period of time, and does this frequently to determine connectivity. This all occurs without inadvertently illuminating the lights because of the low current and short duration of the ramp signal. Further, the present system may determine the type of load (sometimes referred to as a "load profile"), such as an incandescent load, an LED load, or no load. The load profile is indicative of what type, if any, lamp is connected to the trailer lamp controller.

Figure 1:
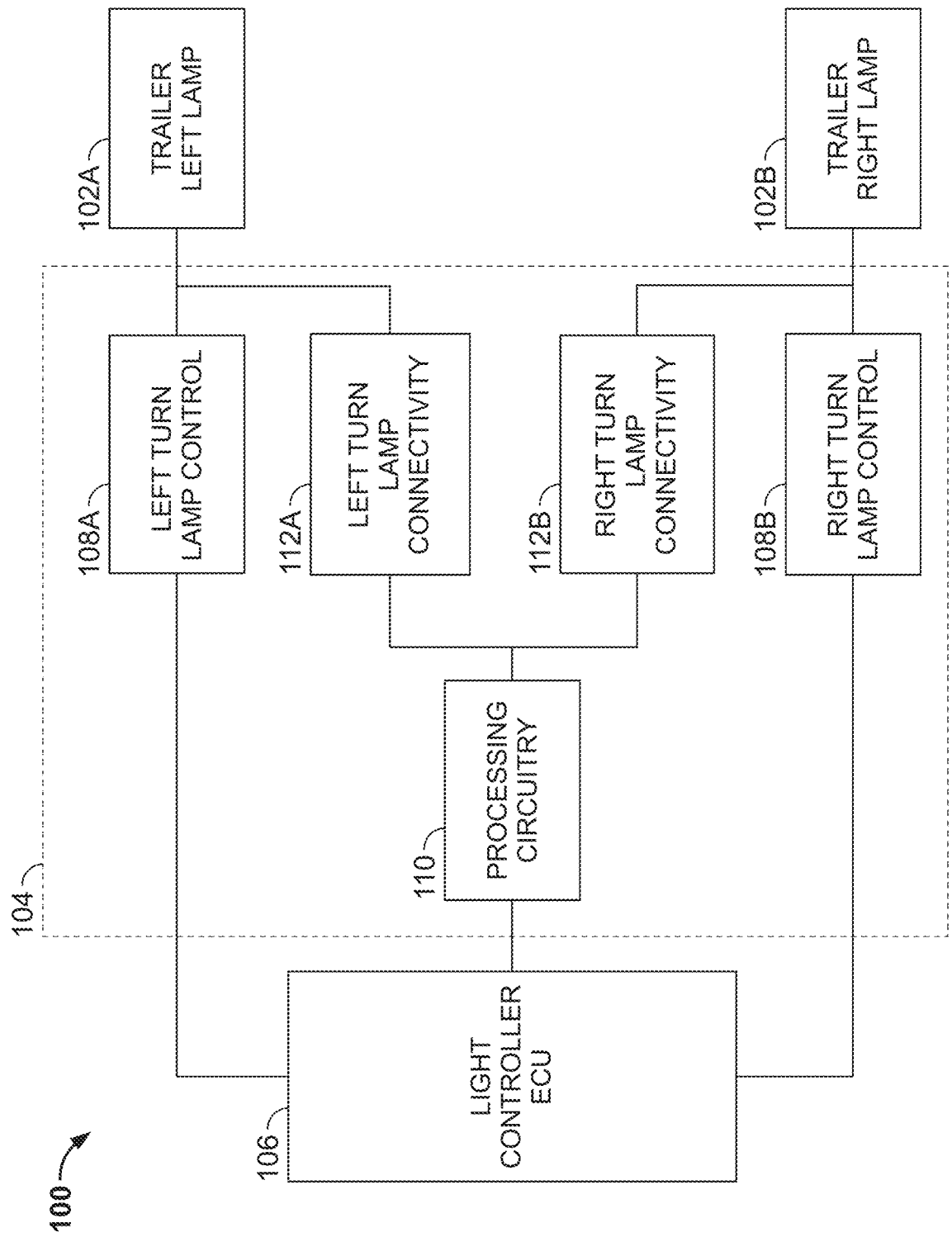
FIG. 1 is a conceptual diagram for a system to determine a connection state of lights of a trailer operating in accordance with the teachings of this disclosure. In the illustrated examples, turn signal are depicted as an example. However, the system may be used for other types lamps/lights.

FIG. 1 is a conceptual diagram for a system 100 to determine a connection state of lights 102A and 102B (collectively referred to as "lights 102) of a trailer operating in accordance with the teachings of this disclosure. While lights 102A and 102B are shown in the illustrated examples, the system may also be utilized to detect other lights on the towed vehicle, e.g., braking lights, auxiliary lights, fog, park, reverse or the like. Additionally, while the examples illustrate the system being used to detect the connection state or status of lights of a towed vehicle or trailer, the system may additionally or alternatively be used to detect the connection state or status of lights on the towing vehicle. Accordingly, examples below that disclose the system connected to lights on a towed vehicle also may apply to any of the lights on a towing vehicle.

In the illustrated example, a vehicle or trailer electrical harness includes a trailer control unit 104 comprising circuitry to determine the connection status of the lights 102. While turn signals are generally described below, the circuitry of the trailer control unit 104 may be used to determine connection status of other lights. In the illustrated example, the turn signal detection unit 104 is communicatively coupled to a light controller unit 106 of the vehicle. The light control unit 106 is an electronic control unit (ECU) of the vehicle that is configured to control the lights of the vehicle, including the turn signals of the vehicle. The light control unit 106 controls the lamp control circuits (not shown) of the vehicle to activate the turn signals of the vehicle (not shown).

In the illustrated example, the trailer control unit 104 includes left turn lamp control circuitry 108A and right turn lamp control circuitry 108B (collectively "turn lamp control circuits 108") that operate the lights 102A and 102B, respectively. The turn lamp control circuits 108 may, for example, receive a signal or signals from the light control unit 106 to activate the lights 108 in parallel with the corresponding lights of the vehicle. This is when the lights are turned on at desired illumination in 'ON-state'. In the illustrated example, the trailer control unit 104 also include processing circuitry 110, left turn lamp connectivity circuitry 112A and right turn lamp connectivity circuitry 112B (collectively "turn lamp connectivity circuits 112" or "connectivity circuits 112"). The turn lamp connectivity circuits 112 determine off-state connectivity. Off-state connectivity is used to determine if the lights (e.g., lights 102) are connected (or operatively connected) while the lights are off. In some examples, the turn lamp connectivity circuits 112 can detect the connectivity of the light 102 without turning on the lights 102 and causing no visible illumination of the lights 102. This is challenging because a light emitting diode (LED)-based lights require a relatively small amount of current to illuminate. As described below, the turn lamp connectivity circuits 108 may determine on-state connectivity to detect whether the lights 102 are connected when the lights 102 are turned on. The connectivity in ON state is determined by measuring the current flowing in the lights. The type of lamp can be determined based on the amount of the current. For example, the incandescent lamps carry more current than LED lamps. There should be none or very little current when there is no load.

As described below, the processing circuitry 110 controls the turn lamp connectivity circuits 112 to provide a test signal to the lights 102 and to interpret the response signal to determine the connection state of the light 102. In the illustrated example, the processing circuitry 110 is incorporated into the trailer control unit 104. Alternatively, in some examples, the processing circuitry 110 as described herein may be incorporated into another ECU, such as the light control unit 106 or an on-board computing platform, etc. Alternatively, in some examples, the processing circuitry 110 may be a separate ECU that is communicatively coupled to the trailer control unit 104 and light control unit 106. In some examples, the trailer control unit 104 may use this determination as a proxy for whether or not the trailer is connected to the vehicle. The processing circuitry 110 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs) or discrete electronic hardware.

Figure 2:
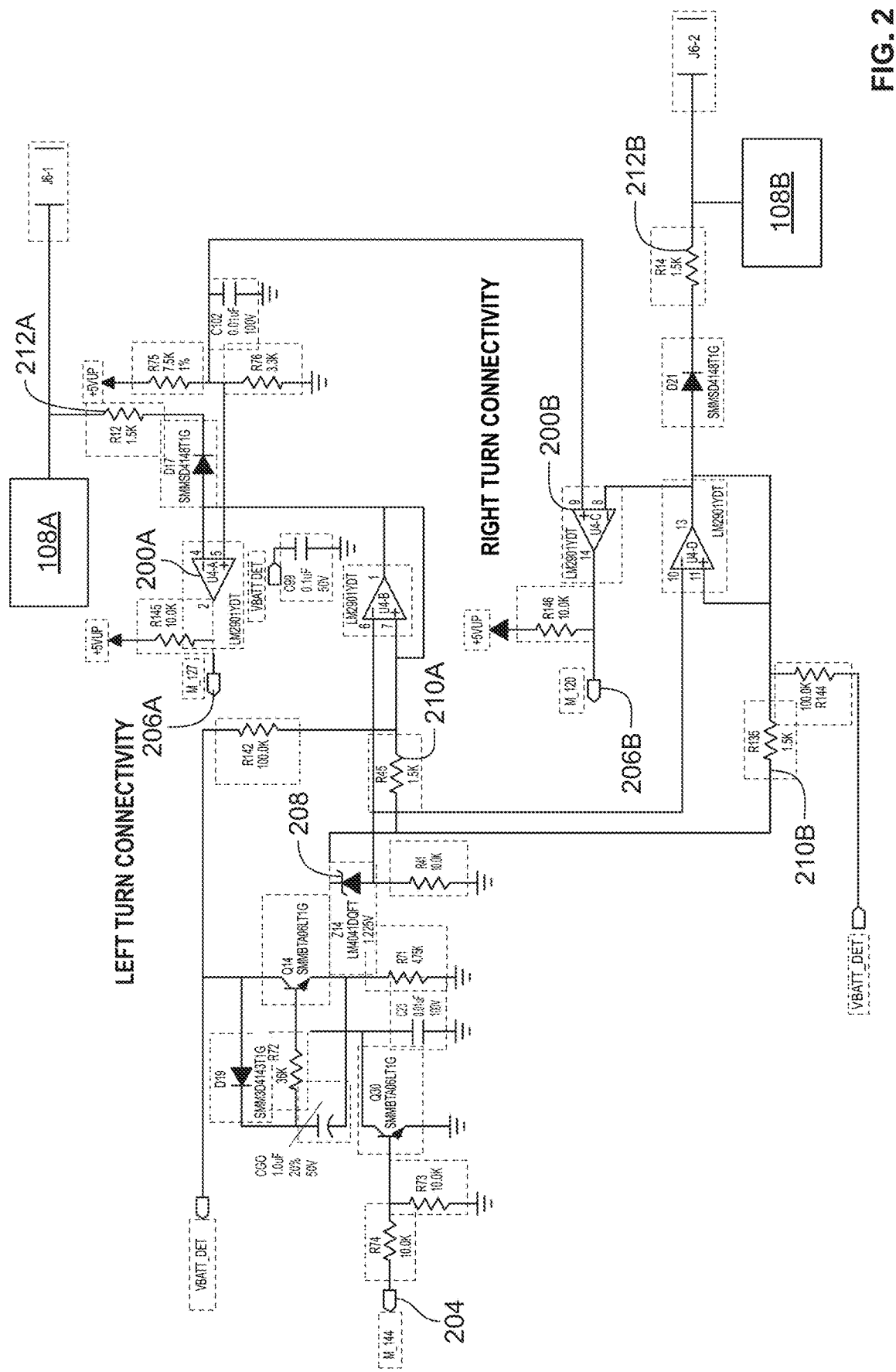
FIG. 2 illustrates example circuits to generate test signals and response signals to determine the connection state of lights of a trailer operating with lights in the off state in accordance with the teachings of this disclosure.

As described below, the turn lamp connectivity circuits 112 generate test signal and shape the response signal based on the connection state of the lights 102. An example of the turn lamp connectivity circuits 112 is illustrated in FIG. 2. For example, FIG. 2 illustrates an example of the left turn lamp connectivity circuitry 112A and an example of the right turn lamp connectivity circuitry 112B. The characteristics of the response signal change depending on whether an incandescent-based turn signal light is connected to the wire harness, an LED-based turn signal light is connected to the wire harness, no turn signal light is connected to the wire harness (e.g., an open circuit). In some examples, the turn lamp connectivity circuits 112 cause the response signal to have different timings of a changing edge (e.g., a rising edge, etc.) of the response signal depending on the type, characteristics, and connection state of the lights 102. The processing circuitry 110 may determine the connection state of the lights 102 by detecting which threshold timing interval in which the changing edge of the response signal rises. For example, the processing circuitry 110 may determine the type, characteristics, and connection state of the lights 102 by detecting which threshold timing interval between the falling edge and rising edge of the response signal.

FIG. 3 is a conceptual diagram of a ramp signal 300 that is presented to a light terminal and responses 302A, 302B, and 302C (collectively "responses 302"). As described below, the ramp signal 300 is generated when a test signal 301 is a logical "ON" value. In the illustrated example of FIG. 3, the reference voltage (e.g., 5 volts) is a logical "OFF" value and ground (e.g., 0 volts) is a logical "ON" value. However, voltages that represent logic the logical "ON" value and the logical "OFF" value may be defined in any manner. The ramp signal 300 may be caused by the test signal 301 transitioning from a reference voltage to ground which turns on a transistor that supplies voltage to a capacitor that generates the ramp signal 300. In some examples, ramp signal 300 is converted to a linear ramp when the capacitor is a bootstrap capacitor that is, for example, 1 µF. The linear ramp 300 starts as a first voltage level (e.g., zero volts) and ramps to a second voltage level 304. In some examples, the second voltage level 304 is the battery voltage. Alternatively, in some examples, the second voltage level 304 is generated by a voltage regulator at a voltage different than the battery voltage (e.g., 9.5V, etc.). In the illustrated example, the ramp signal 300 ramps to the second voltage level 304 exponentially. Alternatively, in some examples, the ramp signal 300 ramps to the second voltage level 304 linearly. In the illustrated example, the processing circuitry 110 defines threshold timing intervals 306A, 306B, and 306C (collectively "threshold timing intervals 306"). The threshold timing intervals 306 define a period of time that, if response 302 falls below a threshold value within that threshold timing intervals 306, the processing circuitry 110 determine that light connection is in a corresponding state (e.g., whether the lamp is connected and, if so, the type of the lamp, etc.). In the illustrated example, an incandescent threshold timing interval 306A defines a period of that in which the leading edge is indicative of an incandescent light being connected electrically coupled to the trailer control unit 104 (e.g., via the wire harness, etc.). As one example, the incandescent threshold timing interval 306A may be from 0 microseconds (µs) to 210 µs, the LED threshold timing interval 306B may be from 210 µs to 559 µs, and the open circuit threshold timing interval 306C may be any interval greater than 559 µs. In such an example, the total length of the ramp signal 300 may be 700 is. The duration of the ramp signal 300 is configured such that lamps 102 do not visibly illuminate under the influence of the ramp signal 300. In the illustrated example, three threshold timing intervals 306 are defined to distinguish between incandescent lights and LED lights and open load. In some examples, fewer or more threshold timing intervals may be defined.

Lamp detection occurs periodically in OFF state of the lamp. In some examples, the period is either 250 ms or 500 ms (sometimes referred to as the "repetition period"). The period is frequent to, for example, almost immediately detect a disconnection. In some examples, the ramp signal 300 may be generated twice in the repetition period, with a delay (e.g., 12 ms) between each ramp signal 300. For example, the ramp signal 300 for the left turn lamp connectivity circuitry 112A may be the first test signal in the repetition period, and the ramp signal 300 for the right turn lamp connectivity circuitry 112B may be the second test signal in the repetition period. In some examples, when more than two lights are to be tested, the ramp signal 300 may be generated a number of times equal to the number of lights 102 to be tested in the repetition period.

Alternatively or additionally, in some examples, the trailer control unit 104 or, more specifically, connectivity circuits 112, may be duplicated for each lamp/light for which connectivity is to be tested. For example, the trailer control unit 104 may include a connectivity circuit 112 for each lamp/light of the towed vehicle. Alternatively, in some examples, the system 100 may include multiple trailer control units 104 to test connectively of different sets of lamps/lights. In some examples, the trailer control unit 104 may test connectivity of a set (e.g., two, three, four, etc.) of the lights/lamps of the towed vehicle, but not all of the lamps/lights of the towed vehicle. In some examples, the system may include multiple trailer control units 104. Additionally, in some such examples, when multiple trailer control units 104 test connectivity of the lights/lamps of the towed vehicle, each of the trailer control unit 104 may be directly (e.g., via a direct data bus, such as a serial data bus, etc.) or indirectly (e.g., via a vehicle data bus, such as a Controller Area Network (CAN bus), etc.) communicatively coupled to communicate with one another and/or with a single computing device (e.g., the light controller ECU 106), which may be on the towed or towing vehicle.

When a light is not connected, the output of the turn lamp connectivity circuitry 112 (e.g., the response signal 302C) generally mimics the input of turn lamp connectivity circuitry 112 (e.g., the test signal 301) and current doesn't conduct through the open circuit. When a light is connected current eventually conducts through the light (e.g., relatively quickly for an incandescent lamp, relatively longer for an LED lamp). As described below, the circuitry of the turn lamp connectivity circuitry 112 may be configured to detect, directly or indirectly, when this lamp current exceeds a threshold value.

FIG. 2 illustrates examples of comparator circuits 200A and 200B within the turn lamp connectivity circuitry 112 configured to detect the change of the current. In some examples, the input of the comparator circuits 200A and 200B may be configured such that the voltage on the input is greater than a reference voltage (e.g., in non-inverting input of comparator circuit 200A) when the current conducted by the light due to the test signal 301 satisfies (e.g., is greater than or equal to) a threshold current (e.g., 500 uA, 700 uA, etc.). Accordingly, the output of the comparator circuits 200A and 200B may (a) be at a high voltage (e.g., a supply voltage, etc.) when the current related to the response signal 302 is above the threshold current (e.g., 500 uA, 700 uA, etc.) and (b) be at a ground when the voltage of the response signal 302 is below the threshold current. In the illustrated example of FIG. 2, Zener diode 208 and resistors 210A and 210B determine the current. Alternatively or additionally, other circuitry, such as one using a hall sensor, may be used to directly or indirectly detect when the current conducted though the light is above a current threshold. In some examples, an edge detector within the processing circuitry 110 or ECU 106 stops a timer begun at the start of the test signal 301 when the changing edge (e.g., a rising edge) of the response signal output by the comparator cause by the response 306 is detected. In some examples, the sensitivity of the turn lamp connectivity circuitry 112 may be changed by adjusting the threshold current. In some examples, incandescent lights can be detected because incandescent lights generally conduct current quicker compared to an LED light.

Figure 4A:
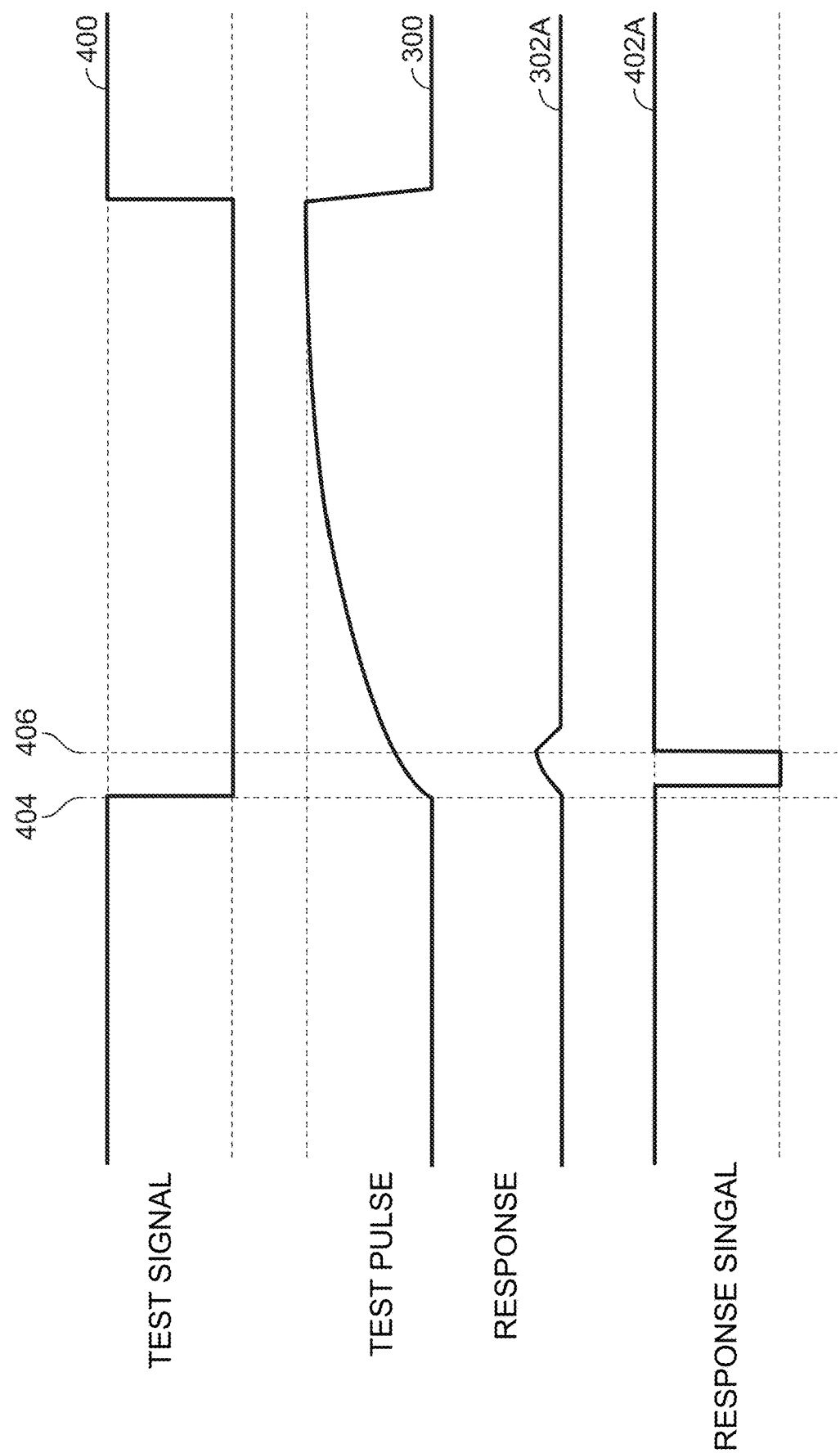
Figure 4B:
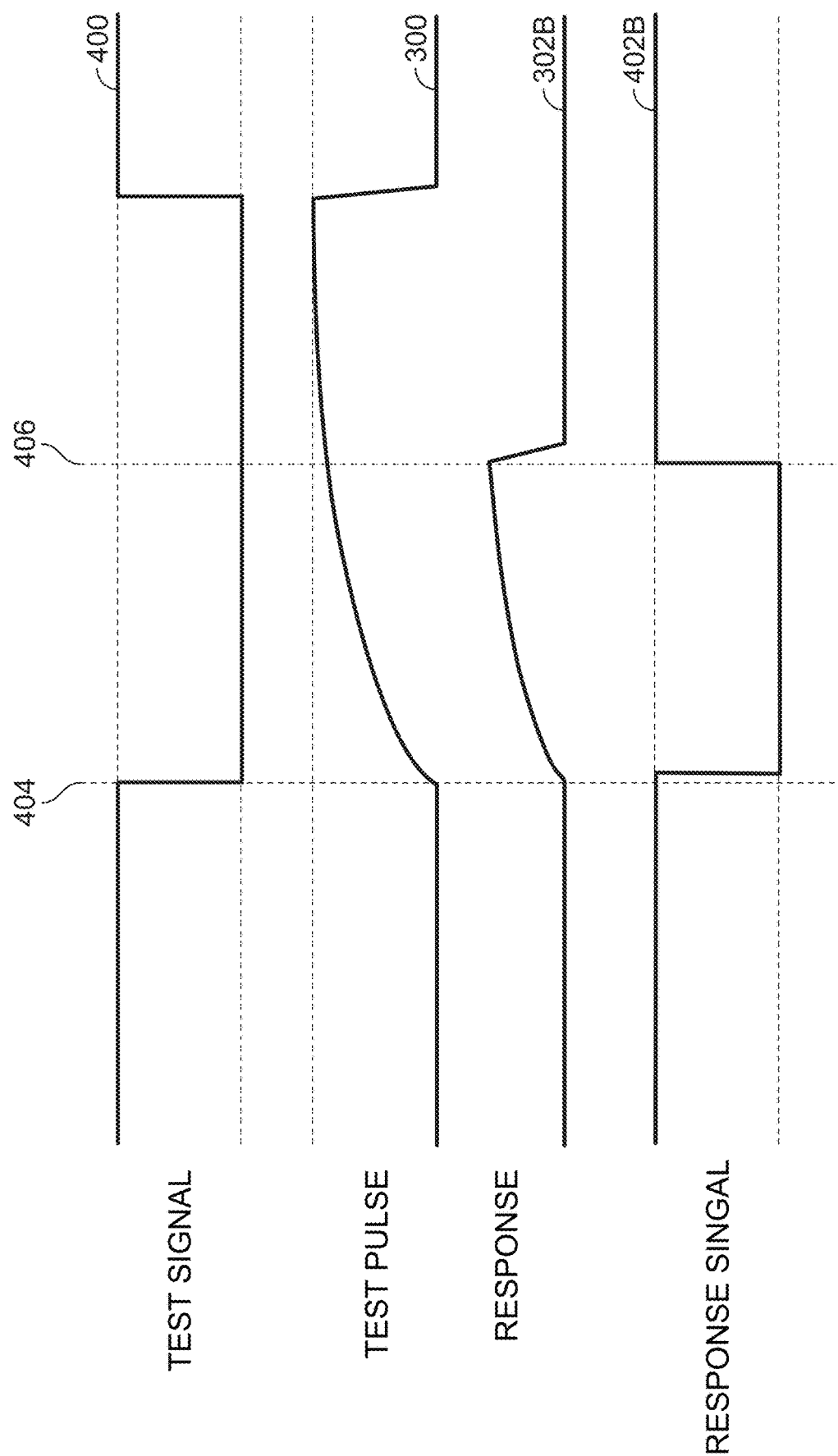

FIGS. 4A, 4B, and 4C illustrate examples of a test signal 400 that causes the ramp signal 300 of FIG. 3 and the response signals 402A, 402B, and 402C (collectively "response signals 402") based on the responses 306A, 306B, and 306C of FIG. 3. In the illustrated example of FIG. 2, input 204 receives the test signal 400, output 206A outputs the response signal 402 for the left turn lamp control circuitry 108A, and output 206B outputs the response signal 402 for the right turn lamp control circuitry 108B. FIG. 4A illustrates a test signal 400 and corresponding response signal 402A when an incandescent light is connected. In the illustrated example, the response signal 402A changes from a logical high voltage (e.g., 5 volts) to a logical low voltage (e.g., ground) when the corresponding response 306A is indicative that the light 102 being tested in conducting current above a threshold, which is, in some examples, a current threshold. Because FIG. 4A illustrates a scenario when incandescent lights are used for the lights 102, the response 302A is indicative of the light conducting current above the threshold current quickly resulting in a relatively short response signal 402A (as measured from the falling edge 404 of the test signal 400 to the rising edge 406 of the response signal 402A). Resistors 212A and 212B of FIG. 2 cause a delay between the falling edge 404 of the test signal 400 and the corresponding falling edge of the response signal 402A, 402B and 402C. FIG. 4B illustrates the test signal 400 and corresponding response signal 402B when an LED light is connected. In the illustrated example, the response signal 402B changes from a reference voltage (e.g., 5 volts) to ground when the corresponding response 302B is indicative that the light is conducting current above the current threshold. Because FIG. 4B illustrates a scenario when LED lights are used for the lights 102, the response 302B is indicative of the light conducting above the threshold current before the test signal 400 ends resulting in a relatively shorter response signal 402B (as measured from the falling edge 404 of the test signal 400 to the rising edge 406 of the response signal 402B) compared to when lights 102 are not connected. FIG. 4C illustrates the test signal 400 and corresponding response signal 402C when no light is connected. Because FIG. 4C illustrates a scenario when lights 102 are not connected, the response 302C is indicative of no current being conducted resulting in a response signal 402A (as measured from the falling edge 404 of the test signal 400 to the rising edge 406 of the response signal 402C) that is similar to the test signal 400.

The trailer control units 104 performs the connection tests frequently (e.g., once every, 250 ms, once every 500 ms, once every 1000 ms, etc.) to discover a disconnection status or confirm a connection status of the lamps/lights. The trailer control units 104 may to send a signal to a processor or other device, such as for example, a brake controller, a display on a towing vehicle, a smart phone or any other device that may be communication with the trailer control units 104 to identify either or both of a connected or disconnected status for the lights/lamps of the towed vehicle. The trailer control units 104 may also detect whether the applicable lights/lamps are operational.

In some examples, the trailer control units 104 may define two different current thresholds to determine whether there is corrosion in the system. The trailer control units 104 may analyze the voltage to determine whether there is potentially corrosion present. For example, the trailer control unit 104 may use 350 µA and 700 µA current thresholds. The trailer control unit 104 first applies a current threshold of 350 µA and then detect the resultant voltage across the system. The trailer control unit 104 may then apply a current threshold of 700 µA and measure the resultant voltage. When the voltage after the second current threshold (e.g., the 700 µA threshold) is approximately twice that of the voltage after the first current threshold (e.g., the 350 µA threshold), the trailer control unit 104 determines that there is corrosion in the system and provides a warning signal to the user to alert them of the corrosion present. When the voltage after the second current threshold is applied is not twice the voltage after the first current threshold (or some linear correlation thereto), the trailer control unit 104 determines that there is no corrosion present (e.g., because the response of the LED would be non-linear). While specific examples of a first current threshold and a second current threshold are provided, the present disclosure isn't limited to these current levels. Any appropriate current level may be utilized without departing from the present teachings.

Figure 5:
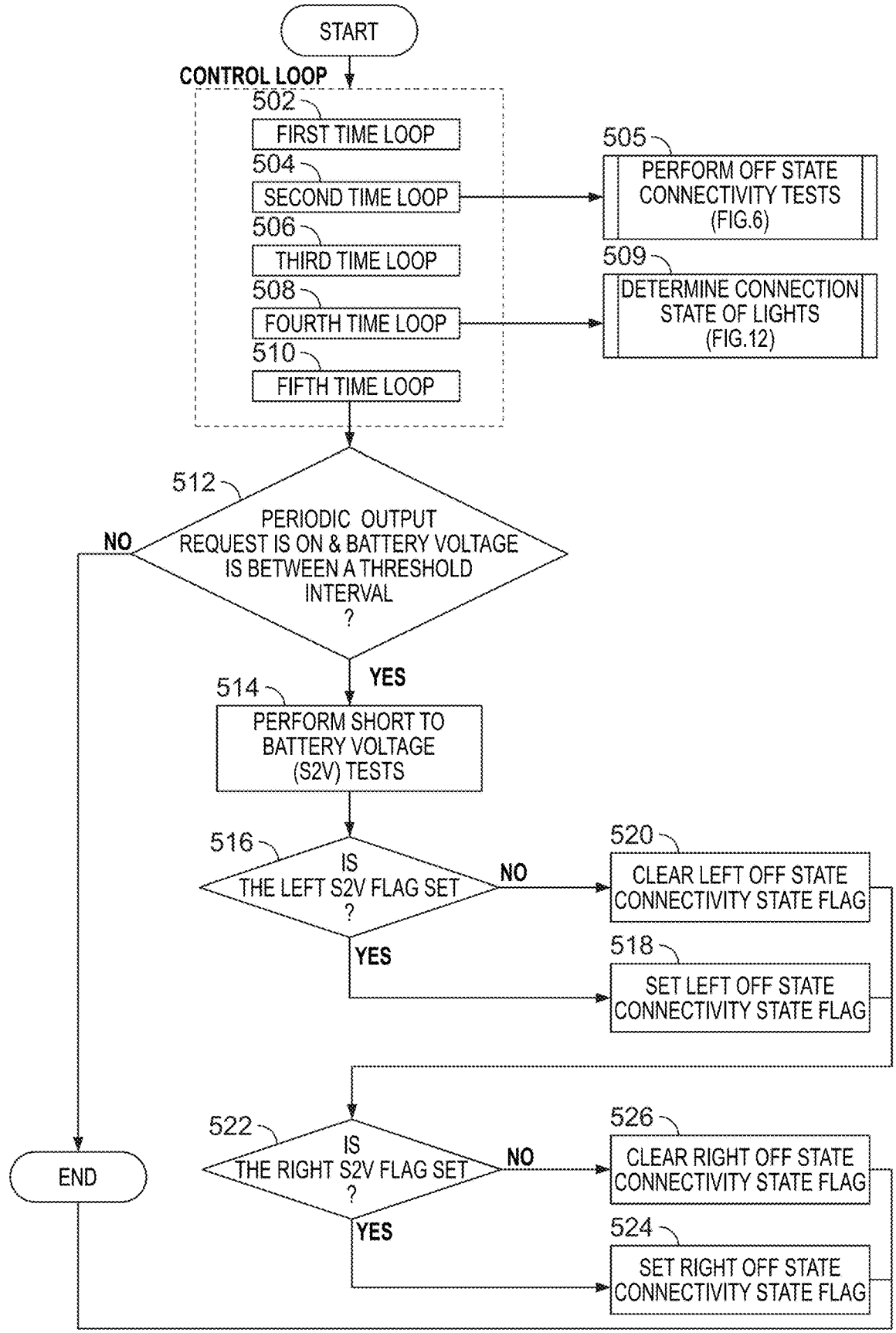
FIGS. 5, 6, 7, 8, 9, 10, 11, and 12 are flowcharts of an example method to determine the connection state of lights of a trailer in accordance with the teachings of this disclosure.

FIG. 5 is an example flowchart of a state machine 500 operated by processing circuitry 110 to determine the connection state of the lights 102. The descriptions of FIGS. 5-12 use example names of flags and variables to facilitate tracking of the status of the connectivity tests. Flags are Boolean variables that each signal a particular condition or status that may be used, for example, to track the status of the corresponding condition is a system (such as a state machine) that involves asynchronous processing. Such names are examples only. The illustrated state machine 500 defines a first time loop (e.g., a 1 ms loop) (502), a second time loop (e.g., a 2 ms loop) (504), a third time loop (e.g., a 5 ms loop) (506), a fourth time loop (e.g., a 10 ms loop) (508), and fifth time loop (e.g., a 20 ms loop) (510). These loops 502, 504, 506, 508, and 510 facilitate actions being taken at every corresponding time interval. For example, the second time loop (504) may trigger actions every two milliseconds and the fifth time loop (510) may trigger actions every twenty milliseconds. Some actions are triggered by the second time loop (504). In the illustrated example, connectivity tests are trigger by the second time loop (e.g., every 2 ms) (see FIG. 6 below) (505). Some actions are triggered by the fourth time loop (508). In the illustrated example, a determination of the connection state of the lights is triggered by the fourth time loop (e.g., every 10 ms) (see FIG. 12 below) (509). Some actions are triggered by the fifth time loop (510) (e.g., every 20 ms).

In the illustrated example, at the fifth time loop (510), the processing circuitry 110 determines whether a periodic output request is "ON" (e.g., or "TRUE," etc.) and the battery voltage is between a threshold interval (e.g., 10-16V, etc.) (512). If periodic output request is "ON" and the battery voltage is between the threshold interval, the processing circuitry 110 performs short to battery voltage (S2V) tests on the right light and the left light to set a left turn S2V flag and/or a right turn S2V flag (514).

Additionally, the processing circuitry 110 determines whether the left turn S2V flag is set (514). If the left turn S2V flag is set (YES at 516), the processing circuitry 110 sets the left turn state connectivity start flag (518). If the left turn S2V flag is not set (NO at 516), the processing circuitry 110 clears the left turn state connectivity start flag (520). The processing circuitry 110 then determines whether the right turn S2V flag is set (522). If the right turn S2V flag is set (YES at 522), the processing circuitry 110 sets the right turn state connectivity start flag (524). If the right turn S2V flag is not set (NO at 522), the processing circuitry 110 clears the right turn state connectivity start flag (526).

Figure 6:
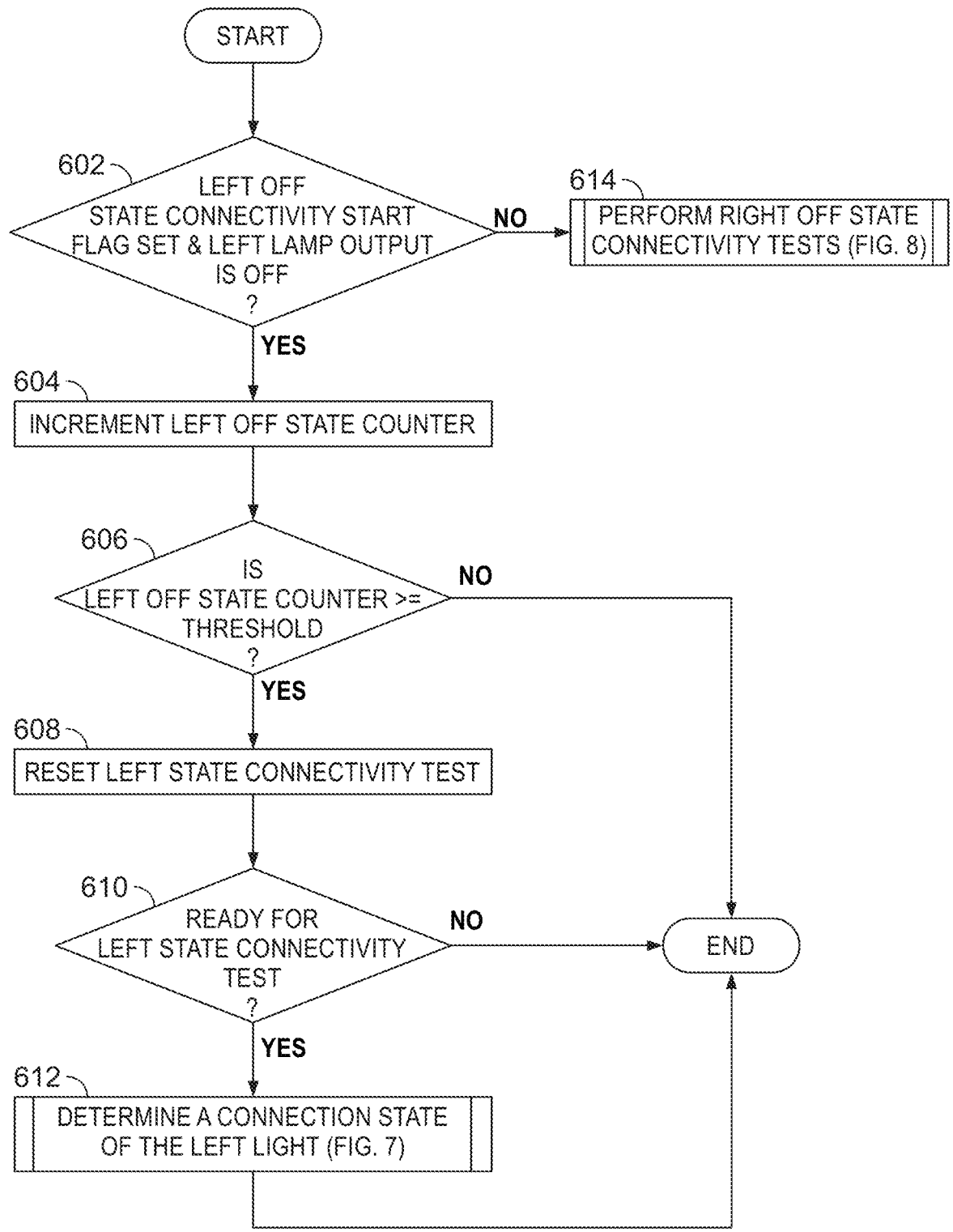

FIG. 6 illustrates an example flowchart for determining a connection state of the lights 102. Initially, the processing circuitry 110 determines whether the left turn off state connectivity flag is set and the left lamp output is off (602). If the left turn off state connectivity flag is set and the left lamp output is off (YES at 602), the processing circuitry 110 increments a left turn off state counter (604). The processing circuitry 110 determines whether the left turn off state counter is greater than or equal to a threshold amount of time (606). For example, the threshold may be set so that at least 10 ms have passed (i.e., the counter is greater than equal to five when the test is run on the 2 ms loop). If the left turn off state counter is greater than or equal to the threshold amount of time, (YES at 606), the processing circuitry 110 resets the left state connectivity test (608). For example, the processing circuitry 110 may reset the left turn off state connectivity flag and clear the left turn off state counter.

The processing circuitry 110 then determines whether the lamp is ready for the left state connectivity test (610) For example, the processing circuitry 110 determines (a) a FET status of the left turn lamp is false, (b) a stop lamp request is false, (c) an event based output request is false, and (d) a turn lamp request equals zero (610). If all of those conditions are true (e.g., the lamp is ready for the left state connectivity test) (YES at 610), the processing circuitry 110 initiates the left turn connectivity test and sets a left turn off state connectivity in progress flag to true (612). The method continues with more functions (see FIG. 7).

If the left turn off state connectivity test in progress flag is not set (NO at 602), the processing circuitry continues to determine the connection state of the right light 102B (see FIG. 8) (614).

Figure 7:
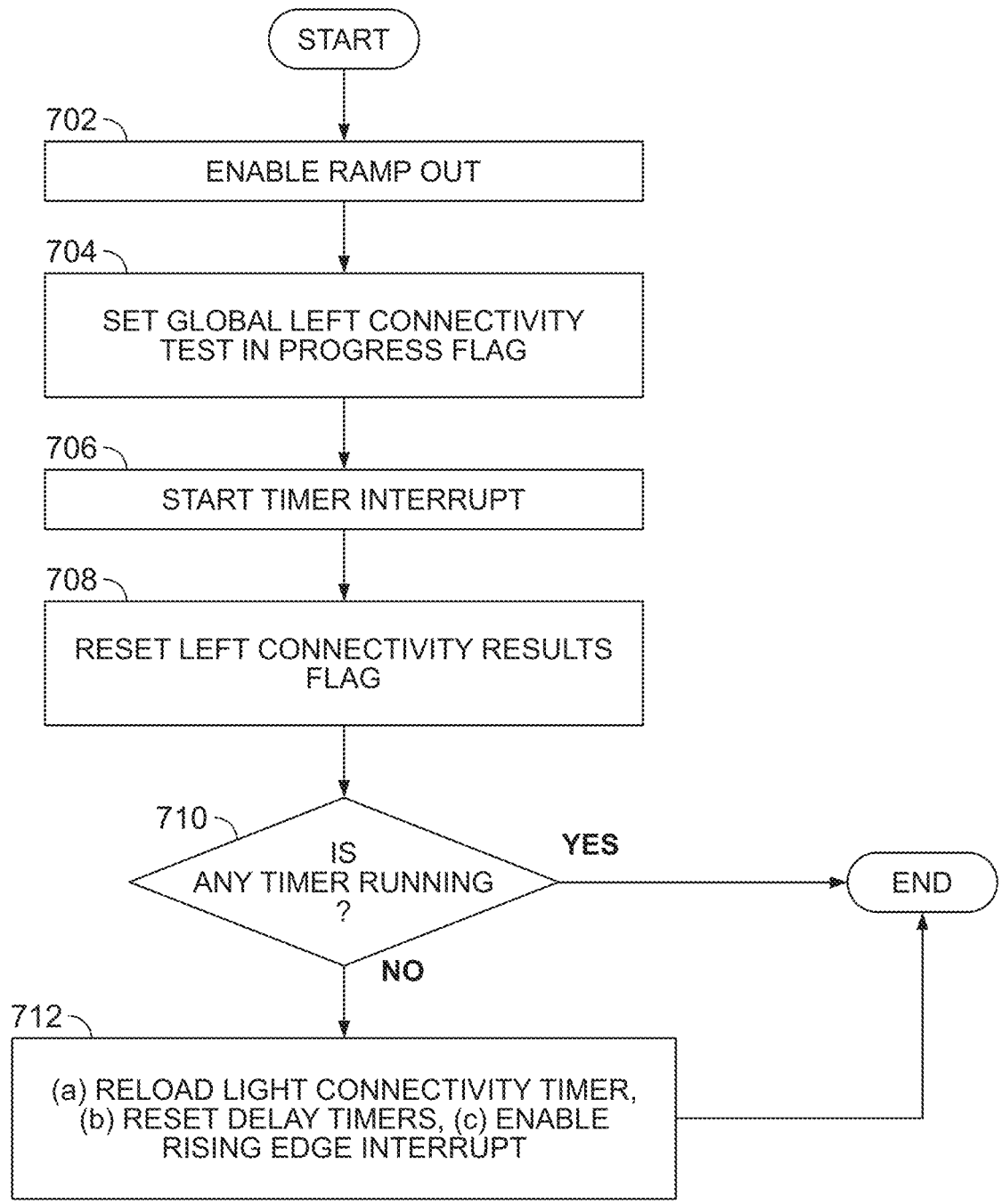

FIG. 7 illustrates an example flowchart for determining a connection state of the left light 102A. The processing circuitry 110 enables the ramp output (e.g., provides test signal 400 to cause ramp signal 300, etc.) (702). The processing circuitry 110 sets a global left connectivity test in progress flag (704). The processing circuitry 110 sets a timer interrupt (e.g., a timer interrupt for 700 µs) (706). The processing circuitry 110 resets the left connectivity results available flag (708). The processing circuitry 110 determines whether any timer in running (710). When a timer is not running (NO at 710), the processing circuitry 110 (a) reloads a light connectivity timer with 700 µs, (b) resets one or more delay flags (e.g., a 300 µs delay flag, a 500 µs delay flag, a 700 µs delay flag, etc.), and (c) enables a rising edge interrupt to detect the rising edge of the response signal (e.g., the response signal 402) (712).

Figure 8:
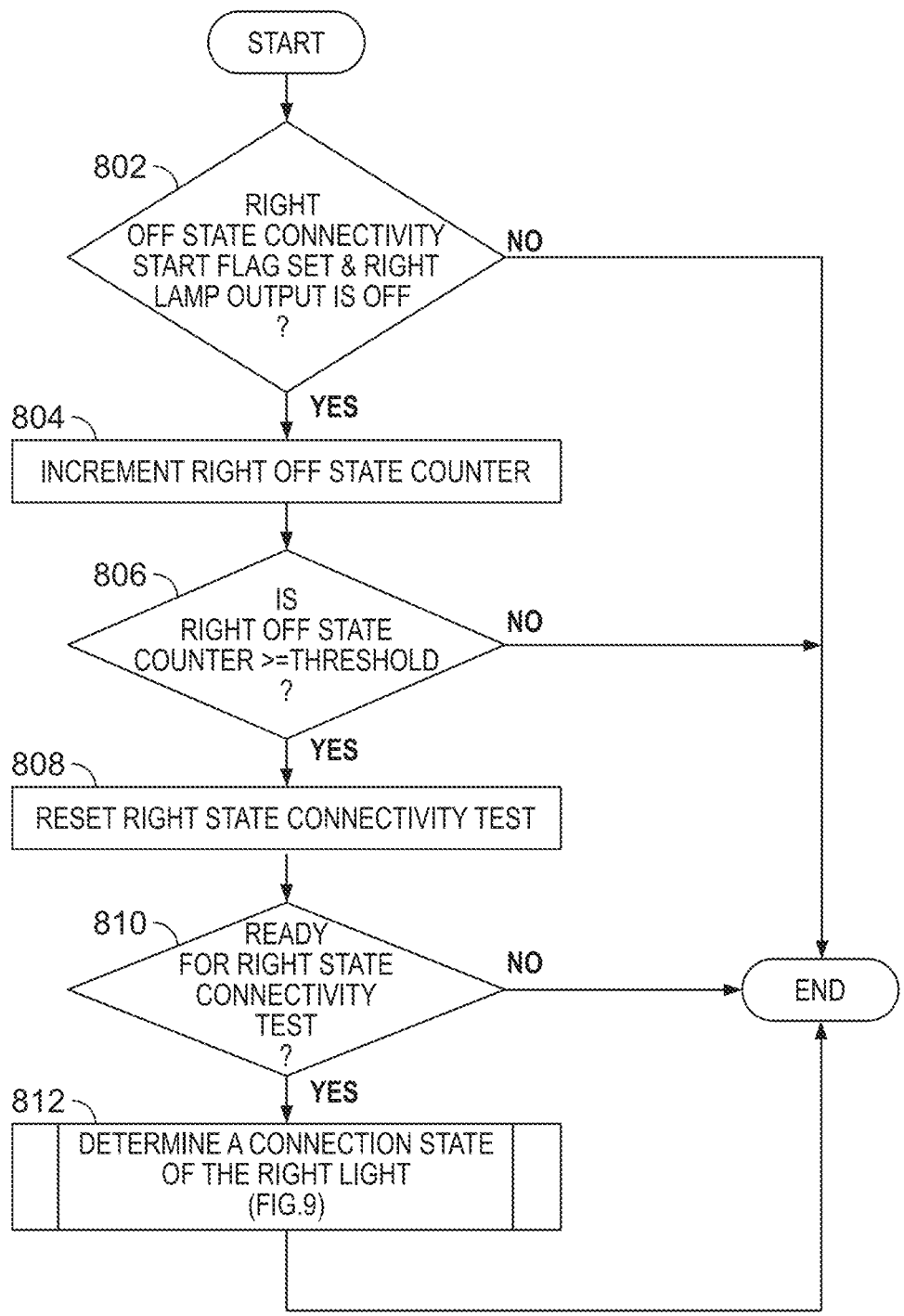

FIG. 8 illustrates an example flowchart for determining a connection state of the right light 102B. The processing circuitry 110 determines whether the right turn off state connectivity flag is set and the right lamp output is off (802). If the right turn off state connectivity flag is set and the right lamp output is off (YES at 802), the processing circuitry 110 increments a right turn off state counter (804). The processing circuitry 110 determines whether the right turn off state counter is greater than or equal to a threshold (806). For example, the threshold may be set so that at least 10 ms have passed (i.e., the counter is greater than equal to five when the test is run on the 2 ms loop). If the right turn off state counter is greater than or equal to five, (YES at 806), the processing circuitry 110 resets the right state connectivity test by resetting the right turn off state connectivity flag and clearing the right turn off state counter (808). The processing circuitry 110 then determines whether the right lamp is ready for the connectivity test (810). For example, the processing circuitry 110 determines (a) a FET status of the right turn lamp is false, (b) a stop lamp request is false, (c) an event based output request is false, and (d) a turn lamp request equals zero (810). If the right lamp is ready for the connectivity test (e.g., all of those conditions are true) (YES at 810), the processing circuitry 110 starts the right turn connectivity test and sets a right turn off state connectivity in progress flag to true (812). The method continues with to determine the connection state of the right light 102B (see FIG. 9).

If the right turn off state connectivity flag is not set and/or the right lamp output is on (NO at 802), the method ends.

Figure 9:
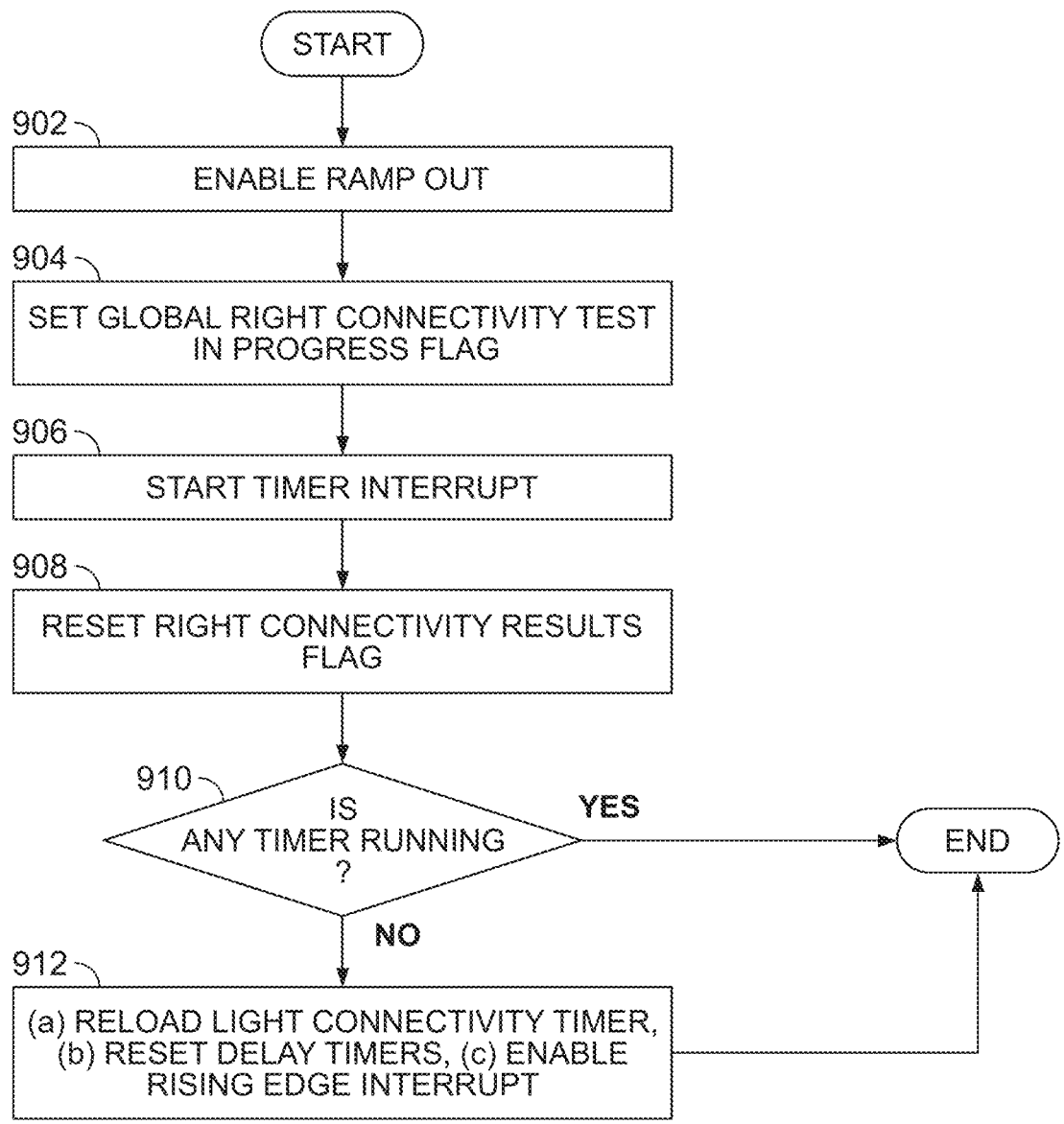

FIG. 9 illustrates an example flowchart for determining a connection state of the right light 102B. The processing circuitry 110 enables the ramp output (e.g., provides test signal 400 to cause ramp signal 300, etc.) (902). The processing circuitry 110 sets a global right connectivity test in progress flag (904). The processing circuitry 110 sets a timer interrupt (e.g., a timer interrupt for 700 µs) (906). The processing circuitry 110 resets the right connectivity results available flag (908). The processing circuitry 110 determines whether any timer in running (910). When a timer is not running (NO at 910), the processing circuitry 110 (a) reloads a light connectivity timer with 700 µs, (b) resets one or more delay flags (e.g., a 300 µs delay flag, a 500 µs delay flag, a 700 µs delay flag, etc.), and (c) enables a rising edge interrupt to detect the rising edge of the response signal (e.g., the response signal 402) (912).

Figure 10:
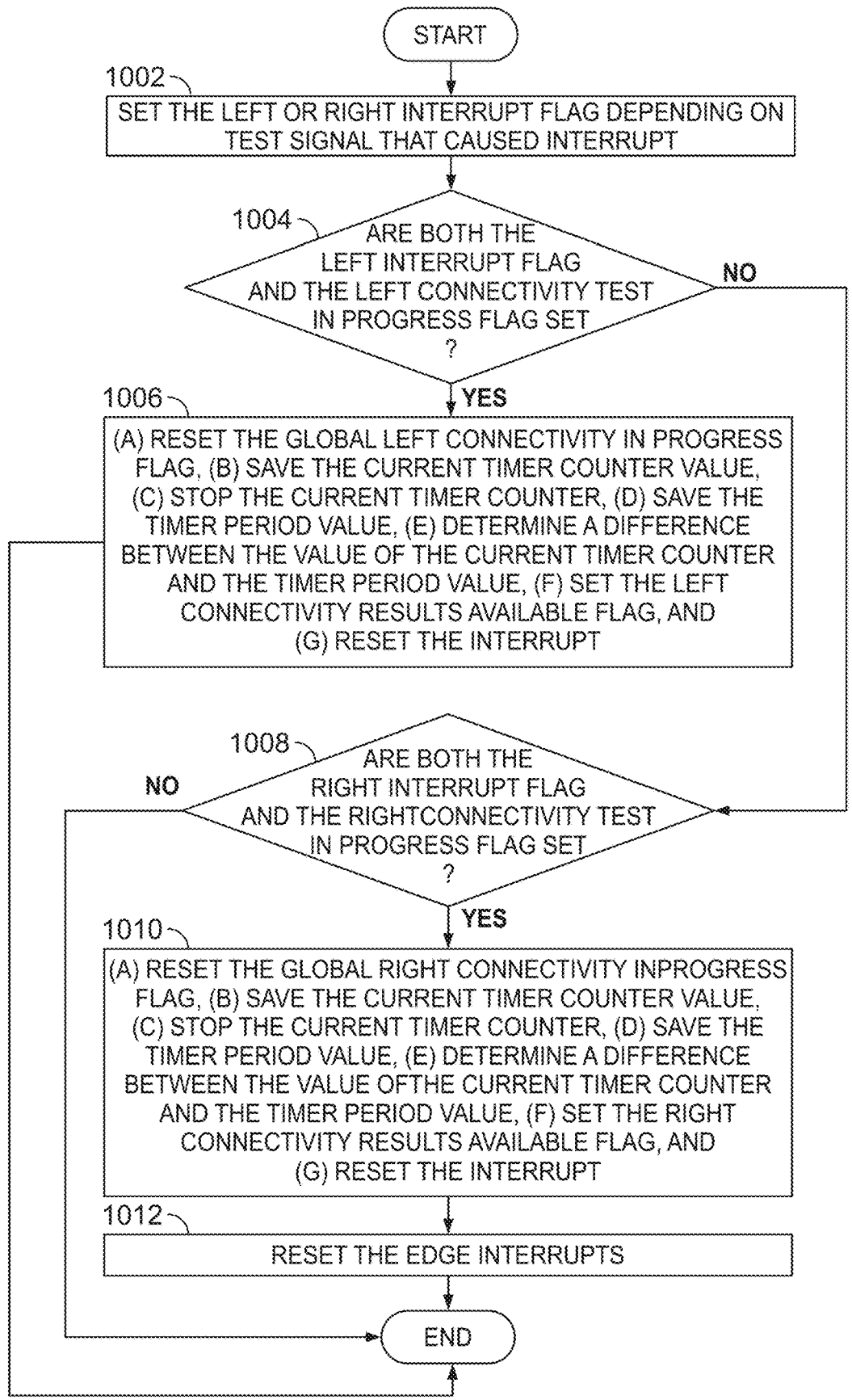

FIG. 10 illustrates an example flowchart for determining a connection state of the lights 102 by processing a rising edge interrupt. The process may be triggered when the rising edge of the response signal 402 is detected. The processing circuitry 110 sets the left or right interrupt flag depending on what test signal caused the interrupt (1002). The processing circuitry 110 determines whether the left interrupt flag is set and the global left connectivity in progress flag is set (1004). When both of these left related flags are set (YES at 1004), the processing circuitry 110 (a) resets the global left connectivity in progress flag, (b) saves the current timer counter value, (c) stops the current timer counter, (d) saves the timer period value, (e) determines a difference between the value of the current timer counter and the timer period value, (f) sets the left connectivity results available flag, and (g) resets the interrupt (1006).

When at least one of the left related flags is not set (NO at 1004), the processing circuitry 110 determines whether the right interrupt flag is set and the global right connectivity in progress flag is set (1008). When both of these right related flags are set (YES at 1008), the processing circuitry 110 (a) resets the global right connectivity in progress flag, (b) saves the current timer counter value, (c) stops the current timer counter, (d) saves the timer period value, (e) determines a difference between the value of the current timer counter and the timer period value, (0 sets the right connectivity results available flag, and (g) resets the interrupt (1010). The processing circuitry 110 resets the edge interrupt of the ports (1012).

Figure 11:
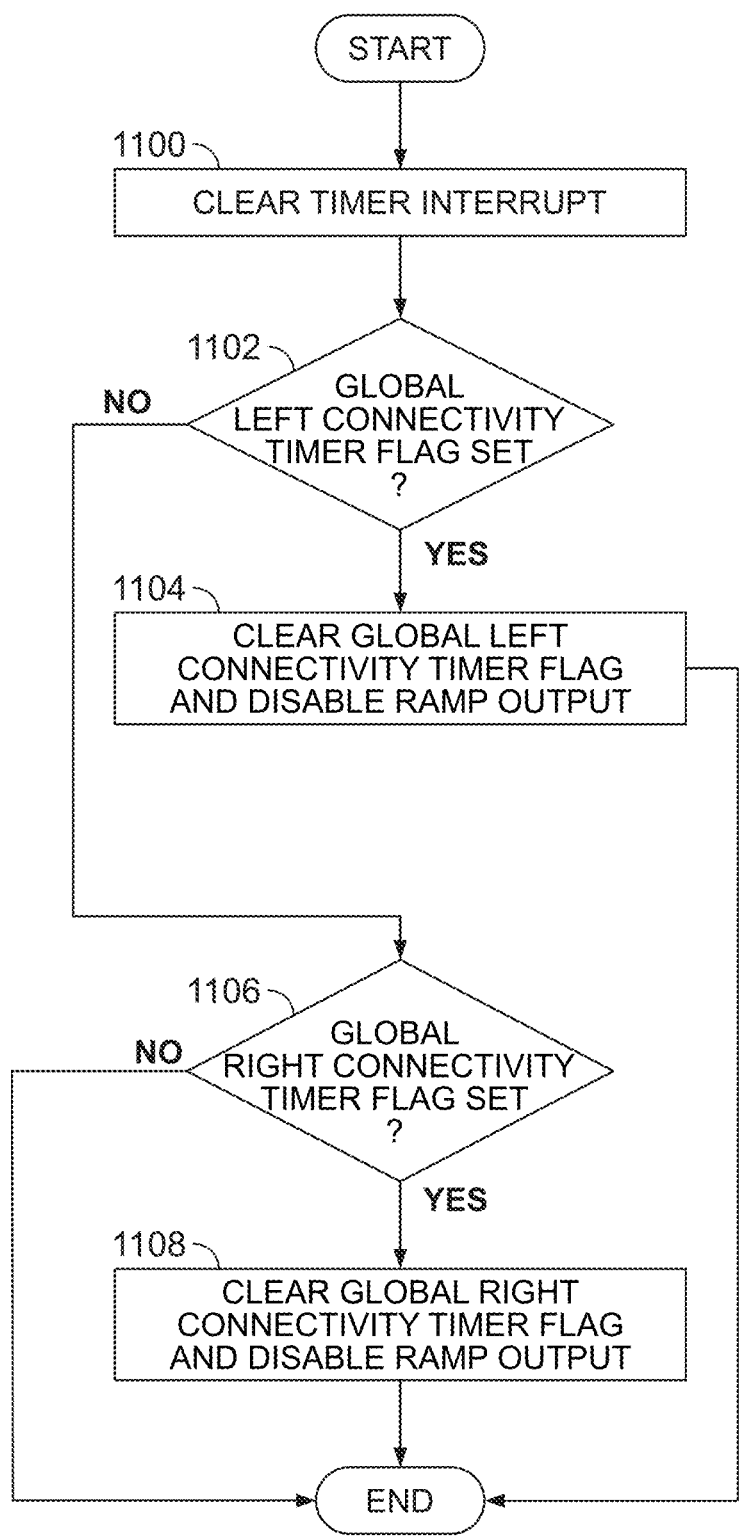

FIG. 11 illustrates an example flowchart for determining a connection state of the lights 102 by processing a timer interrupt. This process triggers when the off state timer interrupt is triggered to end the test signal 400 (and thus end the ramp signal 300). For example, the off state timer interrupt may be triggered 700 µs after the timer has begun. Initially, the processing circuitry 110 clears the off state timer interrupt (1100). The processing circuitry 110 determines whether the global left connectivity timer flag is set (1102). When the global left connectivity timer flag is set (YES at 1102), the processing circuitry 110 (a) clears the global left connectivity timer flag and (b) disabled the ramp output (e.g., changes the test signal 400 from a ground voltage to a reference voltage) (1104).

When the global right connectivity timer flag is set (NO at 1102), the processing circuitry 110 determines whether the global right connectivity timer flag is set (1106). When the global right connectivity timer flag is set (YES at 1106), the processing circuitry 110 (a) clears the global right connectivity timer flag and (b) disabled the ramp output (e.g., changes the test signal 400 from a ground voltage to a reference voltage) (1108).

Figure 12:
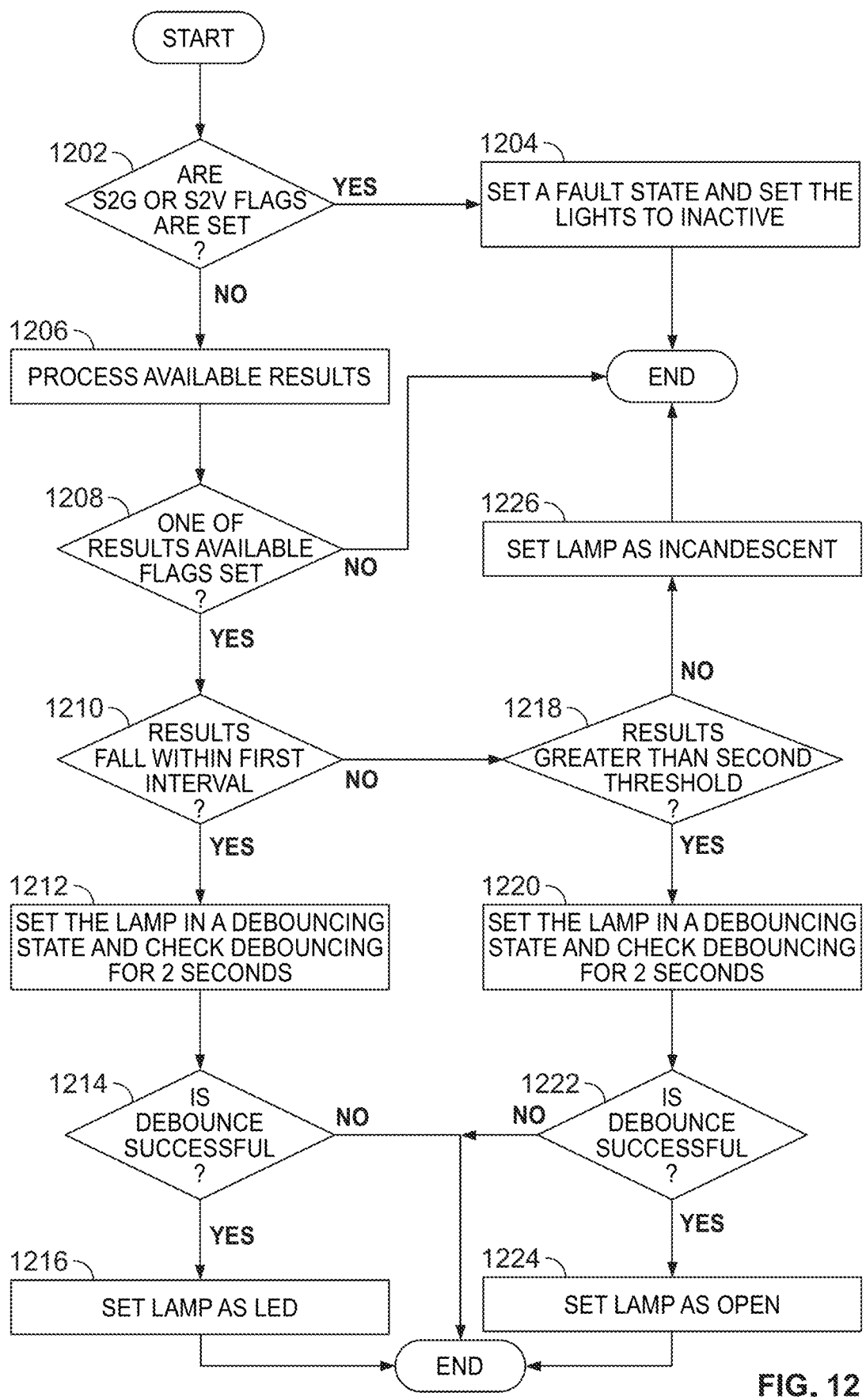

FIG. 12 illustrates an example flowchart for determining a connection state of the lights 102. The process may be executed every 10 milliseconds (e.g., by the fourth time loop (508) of FIG. 5 above). Initially, the processing circuitry 110 determines whether the S2G or the S2V flags are set (1202). When either flag is set (YES at 1202), the processing circuitry 110 sets a fault state and sets the lights to inactive (1204). When neither flag is set (NO at 1202), processing circuitry 110 processes the available results (e.g., the results generated at steps 1004 or 1010 of FIG. 10 above) (1206). The processing circuitry 110 determines whether either of the results available flags are set (e.g., the left results available flag or the right results available flag) (1208). Then either of the results available flags are set (YES at 1208), the processing circuitry compares the results (e.g., the difference between the value of the current timer counter and the timer period value) to the first interval thresholds (e.g., between 210 µs and 560 µs) (1210). When the results fall within the first interval thresholds (YES at 1210), the processing circuitry 110 (a) sets the lamp in a debouncing state and (b) checks debouncing for 2 seconds (1212). The processing circuitry 110 determines whether debouncing was successful (1214). When debouncing is successful (YES at 1214), the processing circuitry 110 sets the connection state of the corresponding light 102 to be an LED light (1216).

When the results do not fall within the first interval thresholds (NO at 1210), the processing circuitry 110 determines whether the results are greater than a second threshold (e.g., greater than 560 µs, etc.) (1218). When the results are greater than the second threshold (YES at 1218), the processing circuitry 110 (a) sets the lamp in a debouncing state and (b) checks debouncing for 2 seconds (1220). The processing circuitry 110 determines whether debouncing was successful (1222). When debouncing is successful (YES at 1222), the processing circuitry 110 sets the connection state of the corresponding light 102 to be indicative no light (e.g., an open circuit) (1224).

When the results are not greater than the second threshold (NO at 1218), the processing circuitry 110 sets the connection state of the corresponding light 102 to be an incandescent light (1226).

In some examples, the turn lamp connectivity circuitry 112 may additionally or alternatively include circuitry to perform an "on-state" connectivity test. Off-state connectivity tests are performed when the lights are off and on-state connectivity tests are performed when the lights are on. In some examples, an on-state connectivity test may be performed after an off-state connectivity test. In some such examples, the results of each connectivity test may be stored and compared to determine the connection state of the trailer. In detecting an incandescent light during an on-state connectivity test, the light behaves like a short circuit (e.g., a short circuit is indicative of an incandescent light because actual short circuits are very uncommon). If the lamp connectivity circuitry 112 detects a change from a short circuit to an open circuit during the on-state connectivity test, the processing circuitry 110 sets the connection state of the corresponding light 102 to be an incandescent light. To detect incandescent lights, an on-state connectivity test may be performed shortly after an off-state connectivity test as described above.

For the on-state connectivity test, to detect an LED light, the lamp connectivity circuitry 112 includes a smart FET that senses current. The lamp connectivity circuitry 112 uses a calibrated K-factor for the LED lights. To calibrate the K-factor, threshold current is used (e.g., 60 mA, etc.). To determine the K-factor and calibrate the on-state connectivity test for detecting LED lights, a known load (e.g., 60 mA) is sent and then the output at the current sense end of the smart FET is measure. To calculate K-factor, the load current is divided by the current at the current sense pin. This value is stored as a threshold with an actual measurement at the FET. The lamp connectivity circuitry 112 determines that an LED light is connected when the current sensed by the smart FET satisfies (e.g., is greater than or equal to) this stored threshold.

The on-state connectivity test may be utilized independent of or in conjunction with the off-state connectivity described above. The on-state connectivity is particularly difficult for use with LEDs as the low amount of current that illuminates LEDs. The on-state connectivity conducts its assessment as the lights are being turned on so that it can illuminate the lights to conduct the aforementioned assessment. The on-state connectivity doesn't need to prevent illumination of the lights as does the off-state connectivity assessment. Further, a first off-state connectivity assessment (such as the described above) may be conducted. If there is a failure or an inconclusive result, a first on-state assessment may be conducted. This pattern may be repeated or any combination of off-state and on-state connectivity assessments may be performed.

The system described herein facilitates conducting the off-state connectivity test without illuminating the lamps/lights of the towed vehicle. Additionally, having the lamps/lights illuminate during the off-state connectivity test may render the test ineffective. Also, the system described herein does not turn on the lamp/lights inadvertently when not intended those lamps/lights are not being used for their intended purpose. Further, while the system disclosed herein is disclosed as applying to a towed vehicle, the system could also be applied to a towing vehicle such that the system could detect the status of the lights/lamps of the towing vehicle as described above. Further, the system disclosed herein may be utilized to determine a status (e.g., connected or disconnected) of the electrical connection between the towing vehicle and towed vehicle as well as the status of the lights/lamps of the towed vehicle and/or even the towing vehicle. This status information may be utilized in operation of other towing accessories or components. For example, the information regarding the status of the connection between the towing vehicle and towed vehicle may be sent to another component of the towing system (such as a brake controller) or another processor/computing device (such as a smartphone, tablet, cloud computing system or the like). This status indicator may then be used as part of a decisionmaking process, part of larger status indicator (e.g., ready to tow or not ready to tow) or to cause an action. An example of how this could be utilized is disclosed in U.S. Pat. No. 9,738,125, which is incorporated herein by reference.

Although the embodiments of the present invention have been illustrated in the accompanying drawings and described in the foregoing detailed description, it is to be understood that the present disclosure is not to be limited to just the embodiments disclosed, but that the disclosure described herein is capable of numerous rearrangements, modifications and substitutions without departing from the scope of the claims hereafter. The claims as follows are intended to include all modifications and alterations insofar as they come within the scope of the claims or the equivalent thereof

Having thus described the invention, the following is claimed:

1. A system to determine a connection state of lamps of a trailer, the system comprising:
   connectivity circuitry electrically coupled to a connector to provide a first test signal to the lamps of the trailer and condition a response signal indicative of the connection state and the load profile; and
   processing circuitry electronically coupled to the connectivity circuitry to determine the connection state and the load profile of the lamps of the trailer based on the response signal when the lamps of the trailer are off, wherein the processing circuitry is configured to measure a first voltage at first current threshold of a signal generated in response to the first test signal and a second voltage at a second current threshold of a signal generated in response to the first test signal, the first current threshold being different than the second current threshold.

2. The system of claim 1, wherein the processing circuitry is configured to distinguish between at least three load profiles.

3. The system of claim 2, wherein the processing circuitry is configured to distinguish between a first load profile indicative that no lamps of the trailer are connected to the connector, a second load profile indicative that the lamps of the trailer are incandescent-based lamps, and a third load profile indicative that the lamps of the trailer are light emitting diode based lamps.

4. The system of claim 3, wherein processing circuitry is configured to distinguish between the first load profile, the second load profile, and the third load profile based on a timing characteristic of the response signal.

5. The system of claim 4, wherein processing circuitry is configured to determine that load profile of the lamps of the trailer is the first load profile based on the timing characteristic being below a first threshold.

6. The system of claim 4, wherein processing circuitry is configured to determine that load profile of the lamps of the trailer is the second load profile based on the timing characteristic being between a first threshold and a second threshold greater than the first threshold.

7. The system of claim 4, wherein processing circuitry is configured to determine that load profile of the lamps of the trailer is the third load profile based on the timing characteristic being above a second threshold that is greater than a first threshold.

8. The system of claim 1, wherein the processing circuitry is configured to communicatively coupled to an electronic control unit of a towing vehicle.

9. The system of claim 1, further including lamp control circuitry separate from the connectivity circuitry to control an on/off state of the lamps of the trailer, the lamp control circuitry communicably coupled to an electronic control unit of a towing vehicle.

10. The system of claim 1, wherein the processing circuitry defines a state machine to asynchronously control the connectivity circuitry to provide the test signal and determine the connection state and load profile of the lamps of the trailer.

11. The system of claim 1, wherein the connectivity circuitry includes a right lamp connectivity circuit and a left lamp connectivity circuit, and wherein the processing circuitry defines a test cycle to periodically test the connection state and the load profile of the lamps of the trailer by causing the right lamp connectivity circuit to produce a first lamp test signal at a first time that generates a first response signal and causing the left lamp connectivity circuit to produce a second lamp test signal at a second time that generates a second response signal.

12. The system of claim 1, wherein the processing circuitry is configured to detect a presence of corrosion between the connector and the lamps based on a difference between the first voltage and the second voltage.

13. The system of claim 1, wherein a duration of the first test signal is configured such that the lamps, when present, do not visibly illuminate in response to the first test signal.

14. The system of claim 1, wherein the processing circuitry is configured to:
   detect when the lamps are powered on; and
   in response to detecting that the lamps are powered on, suspend generating the test signal while the lamps are powered on.

15. The system of claim 1, wherein the lamps are turn signal lamps of the trailer.

16. The system of claim 1, wherein the lamps are at least one of running lamps, for lamps, reverse lamps, auxiliary lamps, or park lamps.

17. A method of determining a connection state of lamps of a trailer, the method comprising:
   monitoring an on/off state of the lamps of the trailer; and
   when the lamps of the trailer are off;
   generating a first ramp signal for a first one of the lamps;
   monitoring a first response signal generated in response to the second ramp signal; and
   categorizing the connection state and a load profile of the lamps of the trailer based on the first and second response signals.

18. The method of claim 17, wherein categorizing the connection state of the lamps of the trailer based on the first and second response signals comprises distinguishing between at least three load profiles.

19. The method of claim 17, wherein categorizing the load profile of the lamps of the trailer based on the first and second response signals comprises distinguishing between a first load profile indicative that no lamps of the trailer are connected to the connector; a second load profile indicative that the lamps of the trailer are incandescent-based lamps; and a third load profile indicative that the lamps of the trailer are light emitting diode-based lamps.

20. The method of claim 19, wherein distinguishing between the first load profile, the second load profile, and the third load profile comprises distinguishing between the first load profile, the second load profile, and the third load profile based on a timing characteristic of the response signals.

21. The method of claim 20, wherein distinguishing between the first load profile, the second load profile, and the third load profile comprises determining that the load profile of each of the lamps of the trailer is the first load profile based on the timing characteristics being below a first threshold.

22. The method of claim 20, wherein distinguishing between the first load profile, the second load profile, and the third load profile comprises determining that the load profile of each of the lamps of the trailer is the second load profile based on the timing characteristic being between a first threshold and a second threshold greater than the first threshold.

23. The method of claim 20, wherein distinguishing between the first load profile, the second load profile, and the third load profile comprises determining that the load profile of each of the lamps of the trailer is the third load profile based on the timing characteristic being above a second threshold that is greater than the first threshold.

24. A trailer light controller comprising:
a left lamp connectivity circuit electrically coupled to a connector to connect to a left lamp of a trailer, the left lamp connectivity circuit to produce a first test signal and condition a first response signal, the first response signal having a first timing characteristic based on a connection status and a load profile of the left lamp;
a right lamp connectivity circuit electrically coupled to the connector to connect to a right lamp of a trailer, the right lamp connectivity circuit to produce a second test signal and condition a second response signal, the second response signal having a second timing characteristic based on a connection status and a load profile of the right lamp;
a left lamp control circuit coupled to the connector to connect to the left lamp to control the on/off state of the left lamp;
a right lamp control circuit coupled to the connector to connect to right lamp to control the on/off state of the right lamp; and
processing circuitry configured to:
categorize the connection state and the load profile of the left lamp based on the first timing characteristic of the first response signal, and
categorize the connection state and the load profile of the right lamp based on the second timing characteristic of the second response signal.

25. The trailer light controller of claim 24, wherein the processing circuitry is configured to, for each of the left and right lamps, distinguish between a first load profile indicative that the corresponding lamp is not connected to the connector, and a second load profile indicative that the corresponding lamp is one of an incandescent-based lamp or a light emitting diode-based lamp.

26. A method of determining a connection state of a lamp of a trailer, the method comprising:
monitoring an on/off state of the lamp of the trailer; and
when the lamp of the trailer is off:
generating a ramp signal for the lamp;
monitoring a response signal generated in response to the ramp signal;
categorizing the connection state and a load profile of the lamps of the trailer based on the response signal.

* * * * *